United States Patent [19]

Barina

[11] Patent Number: 4,829,596
[45] Date of Patent: May 9, 1989

[54] PROGRAMMABLE CONTROLLER WITH FIBER OPTIC INPUT/OUTPUT MODULE

[75] Inventor: Paul H. Barina, New Berlin, Wis.

[73] Assignee: Allen-Bradley Company, Inc., Milwaukee, Wis.

[21] Appl. No.: 12,565

[22] Filed: Feb. 9, 1987

[51] Int. Cl.[4] .................................................. H04S 9/00
[52] U.S. Cl. ..................................... 455/612; 356/73.1; 370/3; 455/610; 455/617
[58] Field of Search ............... 455/603, 612, 617, 606, 455/607, 618, 619, 609, 600; 370/3; 356/309, 319, 320, 73.1; 375/10

[56]  References Cited
U.S. PATENT DOCUMENTS

| 3,798,612 | 3/1974 | Struger et al. | 340/172.5 |
|---|---|---|---|
| 3,813,649 | 5/1974 | Struger et al. | 340/172.5 |
| 3,942,158 | 3/1976 | Dummermuth | 340/172.5 |
| 4,070,702 | 1/1978 | Grants et al. | 364/200 |
| 4,136,960 | 1/1979 | Huang et al. | 356/73.1 |
| 4,165,534 | 8/1979 | Dummermuth et al. | 364/900 |
| 4,234,253 | 10/1980 | Higginbotham | 356/73.1 |
| 4,280,765 | 7/1981 | Pophillat | 356/73.1 |
| 4,289,398 | 9/1981 | Robichaud | 356/73.1 |
| 4,326,193 | 4/1982 | Markley et al. | 340/365 |
| 4,413,319 | 11/1983 | Schultz et al. | 364/200 |
| 4,442,504 | 4/1984 | Dummermuth et al. | 364/900 |
| 4,521,115 | 6/1985 | Higginbotham | 356/73.1 |
| 4,551,019 | 11/1985 | Vella et al. | 356/73.1 |
| 4,637,072 | 1/1987 | Hellström | 455/612 |
| 4,673,299 | 6/1987 | Dakin | 356/73.1 |
| 4,710,022 | 12/1987 | Soeda | 356/73.1 |
| 4,726,676 | 2/1988 | Maslaney | 356/73.1 |
| 4,750,833 | 6/1988 | Jones | 356/73.1 |

Primary Examiner—Robert L. Griffin
Assistant Examiner—Leslie Van Beek
Attorney, Agent, or Firm—Quarles & Brady

[57] ABSTRACT

A fiber optic communication system especially adapted for use with a programmable industrial controller includes a mechanism for evaluating the quality of the fiber optic link. The system includes a transmitter for sending a different unique character over the fiber optic cable at a plurality of light intensities. A receiver is coupled to the fiber optic cable for receiving the characters from the transmitter. The receiver determines whether information was received at each of the plurality of light intensities by determining which of the unique characters were received. In response to the determination of the light intensities that were received an evaluation of the quality of the fiber optic communication system is made.

6 Claims, 8 Drawing Sheets

CHARACTER RECEIVE INTERRUPT

60 μSEC INTERRUPT

250 μSEC INTERRUPT

| | POWER WORD | | | | |
|---|---|---|---|---|---|
| | F | 1/2 | 1/4 | OUT | QUALITY |
| a | 0 | 0 | 0 | 0 | NO CHANGE |
| b | 0 | 0 | 1 | 1 | GOOD |
| c | 0 | 1 | 0 | 1 | BAD |
| d | 0 | 1 | 1 | 1 | GOOD |
| e | 1 | 0 | 0 | 1 | BAD |
| f | 1 | 0 | 1 | 1 | GOOD |
| g | 1 | 1 | 0 | 1 | GOOD |
| h | 1 | 1 | 1 | 1 | GOOD |

PROGRAMMABLE CONTROLLER WITH FIBER OPTIC INPUT/OUTPUT MODULE

The field of the invention is programmable controllers such as those described in U.S. Pat. Nos. 3,810,118; 3,942,158; 4,165,534 and 4,442,504 and particularly fiber optic input/output modules for such controllers.

BACKGROUND OF THE INVENTION

Programmable controllers are typically connected to industrial equipment, such as assembly lines and machine tools, to sequentially operate the equipment in accordance with a stored program. In programmable controllers such as those disclosed in the above cited patents, for example, the control program is stored in a memory and includes instructions which are read out in rapid sequence and executed to examine the condition of selected sensing devices on the controlled equipment, or to energize or deenergize selected operating devices on such equipment contingent upon the status of one or more of the examined sensing devices.

The processor for these controllers is designed to rapidly execute programmable controller type instructions which in medium to large sized controllers includes not only instructions that manipulate single-bit input and output data, but also arithmetic instructions, file handling instructions, timers and counters, sequencers and other, more complex instructions. Such instructions have become quite standardized in the industry and they may be directly associated with elements of a ladder diagram which is easily understood by control engineers. Program panels such as those disclosed in U.S. Pat. Nos. 3,798,612 and 3,813,649 and in U.S. Pat. No. 4,070,702 have been developed to assist the user in developing and editing ladder diagram type control programs comprised of such programmable controller instructions. To insure that the programmable controller can respond quickly to change in the status of sensing devices on the controlled system, it is imperative that the controller execute the control program repeatedly at a very high rate. The rate at which a programmable controller can execute the instructions in its instruction set, as well as the size of the control program, are the primary factors which determine the rate at which the programmable controller can repeatedly execute, or "scan", the control program.

The sensing devices that are interfaced to the programmable controllers detect various conditions or states of he equipment being controlled and provide input data for use by the ladder program. In response to the sensor data, the program causes the actuators to activate and deactivate various parts of the equipment. The sensors typically are switches, such as limit switches that open or close as a part of the machine or a workpiece passes by the sensor. The status of the switch, open or closed, is represented in the programmable controller as a high or low level voltage which may be digitally processed as a logical one or a zero.

In certain environments electrical signals are hazardous, such as in chemical processes where a spark could cause an explosion. Therefore, fiber optic control systems have been considered for use in such environments. A fiber optic sensing system could send light from a remote source through a fiber optic cable into the hazardous environment. There a shutter type sensor can transmit or block the flow of light into a second fiber optic cable in response to the sensed condition. The second cable is coupled to a I/O module of the programmable controller.

As with other types of sensor systems, the optical link and its various components degrade over a period of time. The optical couplings and the sensors may increasingly attenuate the light transmission with time which, if allowed to continue, can result in a failure of the sensor link. A technique is required to dynamically monitor the fiber optic sensor link and provide an indication of the onset of its degradation so that the faulty components may be replaced before a catastrophic failure occurs.

SUMMARY OF THE INVENTION

A system for evaluating the quality of an optical communication link, such as a fiber optic cable, transmits light over the link at various intensities. The evaluation is made based on which intensities are received at the other end of the link.

The system comprises a transmitter for sending information over the communication link at several light levels. A receiver is coupled to the link for receiving the transmitted information. Circuitry is provided for determining which of the light intensities were received. Based on that determination the system evaluates the light attenuation and thereby the quality of the communication link.

The present invention provides a mechanism for periodically testing the link and detecting when maintenance should be performed on the link.

BRIEF DESCRIPTION OF THE DRAWINGS

In the drawings which illustrate the embodiments of the present invention.

DETAILED DESCRIPTION OF THE INVENTION

Figure 1:
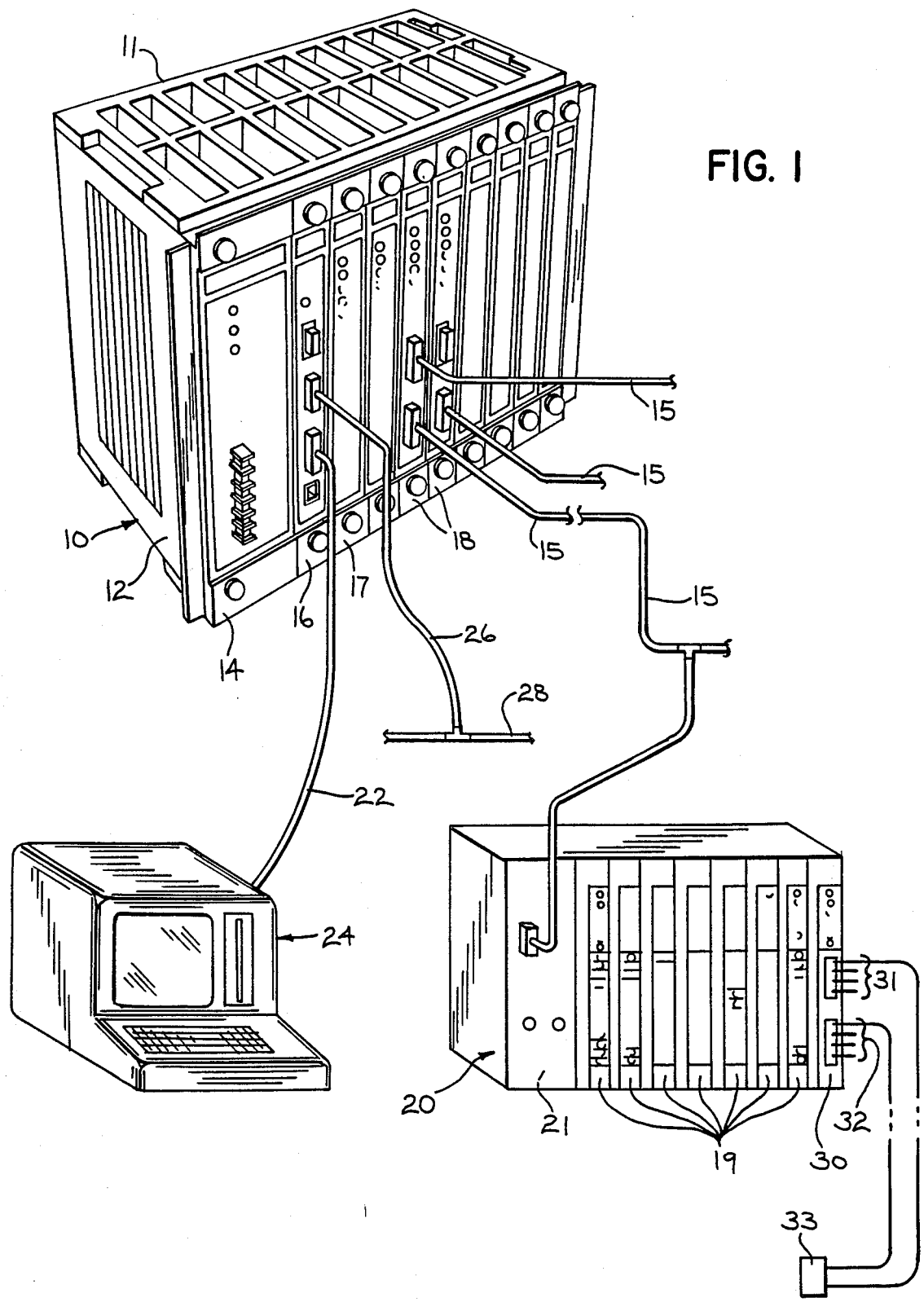
FIG. 1 is a perspective view of a programmable controller which employs the present invention.

With initial reference to FIG. 1, a programmable controller 10 of the present invention is housed in a rack 12 which includes a series of slots that receive a plurality of printed circuit board modules 16–18. These modules connect to a mother board which extends along the back surface of the rack 12 to provide a backplane 11. The backplane has a plurality of module connectors which are electrically interconnected by a conductive pattern on the backplane to provide a series of signal buses to which the modules connect. The rack 12 contains a power supply module 14, a system controller 16, a program execution module 17 and a plurality of remote input/output (I/O) scanner modules 18. The remaining locations in rack 12 are empty and the slots are covered by blank plates until additional modules are to be inserted in these slots. The physcial construction of the rack 12 is disclosed in U.S. patent application Ser. No. 06/909,710 filed on Sept. 22, 1986, and assigned to the same assignee as the present invention.

The system controller 16 is connected through cable 22 to a programming terminal 24 which, for example, may be of the type as disclosed in U.S. Pat. No. 4,326,193 or a personal computer. Terminal 24 may be used to load instructions into the system controller 16 as well as monitor its operation. Once the instructions have been loaded into the system controller 16, and its operation debugged, the terminal 24 may be disconnected from the system controller. In addition, the system controller 16 may be connected via a cable 26 to a local area network 28 over which it may receive data and programming instructions, as well as issue status information and report data to a host computer. This enables a central host computer or central terminal to program and control the operation of a plurality of programmable controllers 10 on a factory floor.

The remote I/O scanning modules 18 interface the controller to external I/O racks 20 via serial I/O networks such as network 15. Each remote I/O rack 20 has a plurality of local I/O modules 19 and 30 which are coupled to individual sensors and actuators on the controlled equipment (not shown). The local I/O modules 19 provide conventional electrical I/O connections which may take many forms and may include, for example, D.C. inputs or outputs, A.C. inputs or outputs, analog inputs or outputs, and open or closed loop positioning modules. The remote I/O rack 20 also contains an adapter module 21 such as the one described in U.S. Pat. No. 4,413,319 which couples data between the I/O modules 19 and the scanner modules 18 via the I/O networks 15. The I/O racks 20 and networks 15 employ conventional interface and communication technology.

The user enters a control program into the controller 10 through either the programming terminal 24 or the local area network 28. The controller 10 is then placed in the "RUN" mode and it repeatedly executes the stored control program to operate output devices connected to the I/O racks 20. Because the condition of the certain input devices can change may times per second, it is imperative that the system controller 16 and the program execution module 17 have sufficient computing power to execute the stored control program rapidly. Also because a large number and variety of input and output devices may be connected to the remote rack 20 to operate a complex machine or process, it is imperative that the control program be developed using a programming language which is easily understood by the user.

In the "run" mode of the programmable controller, the system controller 16 provides supervisory functions of the overall operation of the programmable controller 10. In addition this module 16 handles external communication with the terminal 24 so that the operator may monitor the process controlled by the system and communication with other programmable controllers and a host computers via LAN 28.

The ladder diagram control programs are stored and executed by the program execution module 17. This module 17 sends and receives data and commands to other modules via the backplane 11. Sensor data is received by the programmable controller I/O scanner modules 18 from remote I/O racks 20 and stored in the scanner module memory. As the program execution module 17 needs sensor data, it reads the input data image table in the corresponding scanner module 18. When the program execution module desires to change the state of a control device on the equipment, it writes a new control bit or word in the output data image table of the scanner module 18 that handles commands for that device. The scanner then sends the new control word to the proper remote I/O rack 20 which in turn changes the state of the device via the I/O module 19 to which the device is attached.

Remote module 30 interfaces eight fiber optic cables 31 and 32 to the programmable controller system. Four of the cables 31 transmit a light beam to remote sensors, such as device 33, and the other four cables 32, receive the optical signal response from the sensor. The device 33 has a shutter which responds to the sensed condition to either block or transmit light between the two cables 31 and 32. Four such sensor loops may be connected to the module 30. Although only one fiber optic module 30 is mounted in remote I/O rack 20, additional modules 30 could be inserted as required in other slots in place of conventional modules 19 as required. Alternatively, one fiber optic module 30 may transmit the light to the sensor 33 and the response cable 32 from that sensor could be attached to a different module 30 in same or another controller system. The fiber optic cables and their complings define an optical communication control link.

Figure 2:
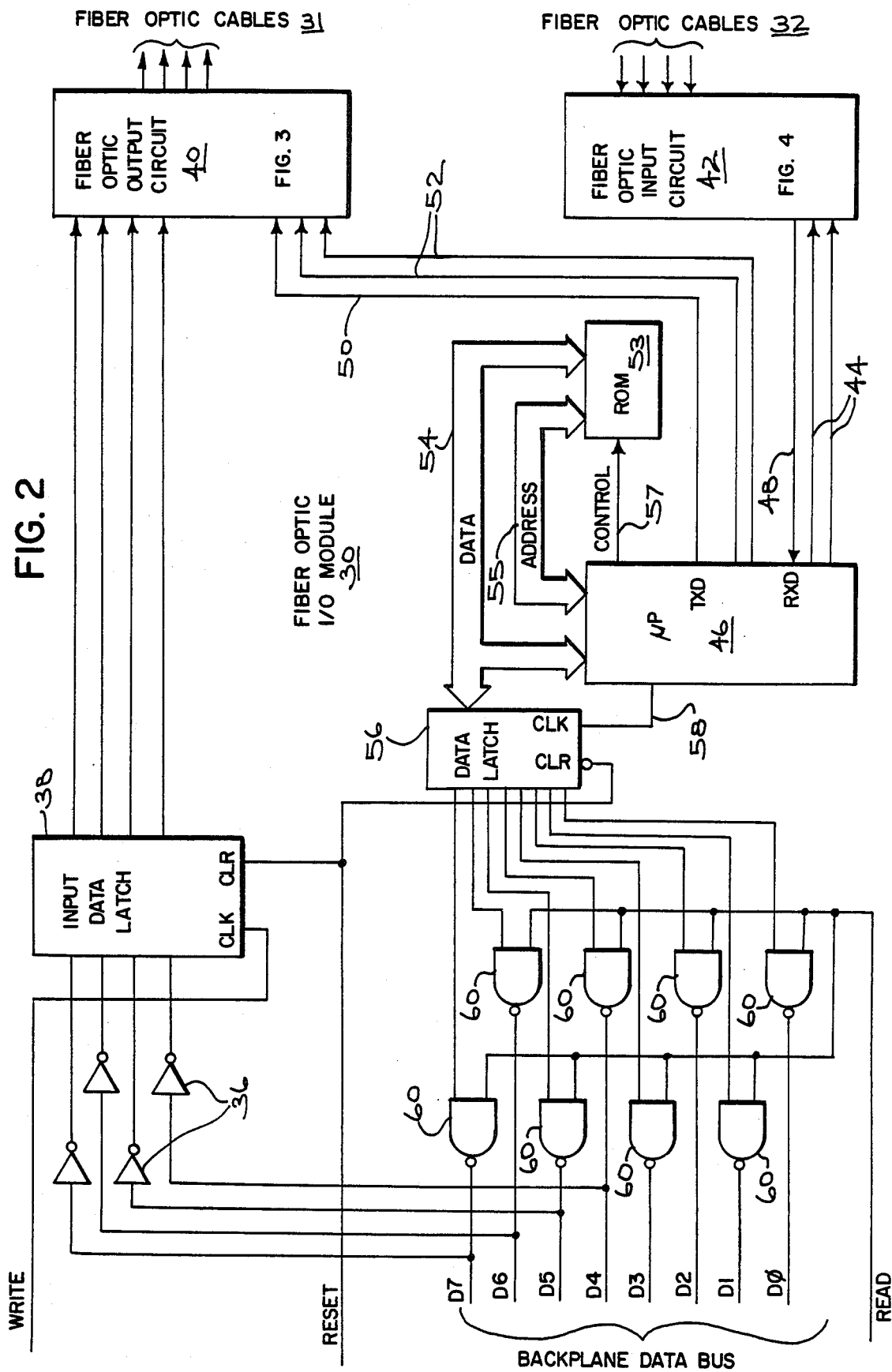
FIG. 2 is a schematic block diagram of the fiber optic input/output module shown in FIG. 1.

With reference to FIG. 2, the eight lines of the backplate data bus (D$\phi$–D7) are connected to the fiber optic module 30 via a standard connector on the module. The four most significant data bits, D4–D7 are connected to four Schmitt trigger inverters 36, the outputs of which are connected to the inputs of a four-bit input data latch 38. The clock input of data latch 38 is connected to a write control line from the backplane control buses. The clear input of the data latch 38 is connected to a reset control line from the backplane of the remote I/O rack 20. The four output lines from the data latch 38 are connected to a fiber optic cable output circuit 40. The fiber optic circuit drives the light emitting diodes that are connected to the transmitting fiber optic cables 31.

Figure 3:
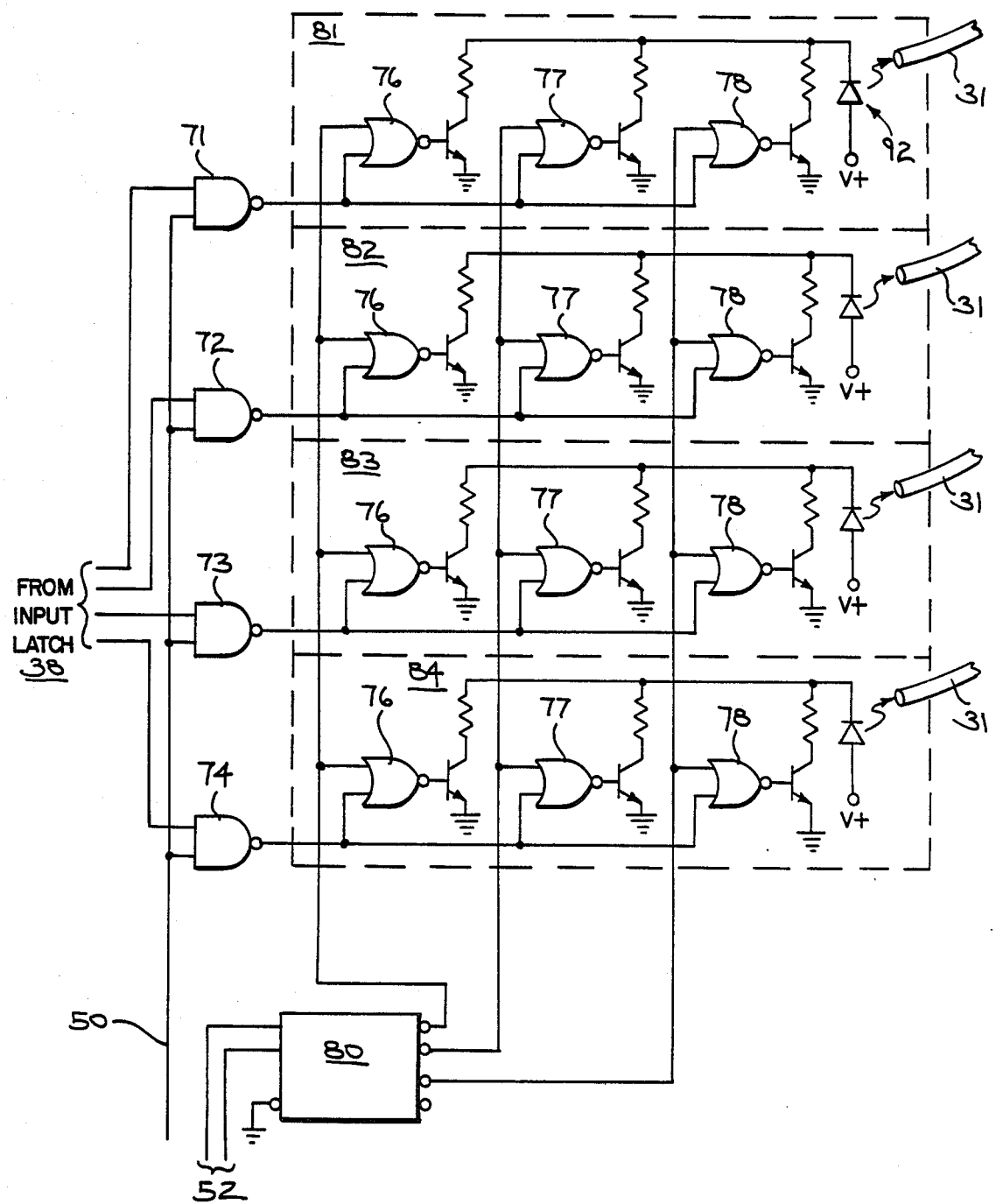
FIG. 3 is a schematic block diagram of the output circuit in FIG. 2.

The details of the fiber optic output circuit 40 are shown in FIG. 3. Each of the four data lines from the input data latch 38 are coupled to one input of four NAND gates 71–74. The other input of each of the NAND gates 71–74 is connected in common to a data character transmission line 50. The output of each of the NAND gates is connected to a separate fiber optic cable driver channels 81–84, respectively. Each of the driver channels is identical and only one of them, channel 81, will be described in detail. The output from the NAND gate 71 is coupled to one input terminal of three NOR gates 76–78. The other input to each of the NOR gates is connected to one of the output terminals of a 2 to 4 digital decoder 80. The decoder 80 responds to a two-bit digital word at its input terminals to produce a low level enabling signal on one of the three output terminal that are connected to the NOR gates 76–78 in each driver. For example, the first output terminal from decoder 80 is connected to the each of the first NOR gates 76, the second output terminal is connected to each of the second NOR gates 77, and the third output terminal of the decoder is connected to the third NOR gates 78.

The output of the first, second and third NOR gates 76, 77 and 78 are connected to the base of three switching transistors 86, 87 and 88, respectively. Each of the switching transistors 86-88 is a NPN type device that has its emitter connected directly to ground. A resistor 96-98 couples the collector of one of the transistors 86-88, respectively, to a common node 90. A light emitting diode (LED) 92 has its cathode connected to the node 90 and its anode connected to a source of positive voltage. One of the fiber optic transmitter cables 31 is optically coupled to each light emitting diode 92 to receive the light generated by the diode.

The value of each of the resistors 96-98 is selected so that a different amount of current will flow through each circuit branch when the corresponding transistor 86-88 is turned on. For example, the second resistor 97 in each channel may have a value that is twice that of the first resistor 96 and the third resistor 98 has a value that is four times that of the first resistor 96. Therefore, when the second transistor 87 is turned on the current that flows through its branch is one-half the amount that flows through the first branch when transistor 86 is on. Similarly, when the third transistor 88 is turned on, the current flowing through its branch will be one-fourth the current that flows through the first branch comprising resistor 96 and transistor 86. Each of the branches defines means for turning on the LED 92 at three different power levels thereby emitting light into the fiber optic cable 31 having three different intensities. The three LED drive currents are selected so that even at the maximum length of the fiber optic link which may typically be 300 meters to and 300 meters from the sensor 33, the light intensity at the one-quarter power level is sufficient to produce a return signal on cables 32 at the I/O module 30 even for the worst case combination of component tolerances.

Figure 4:
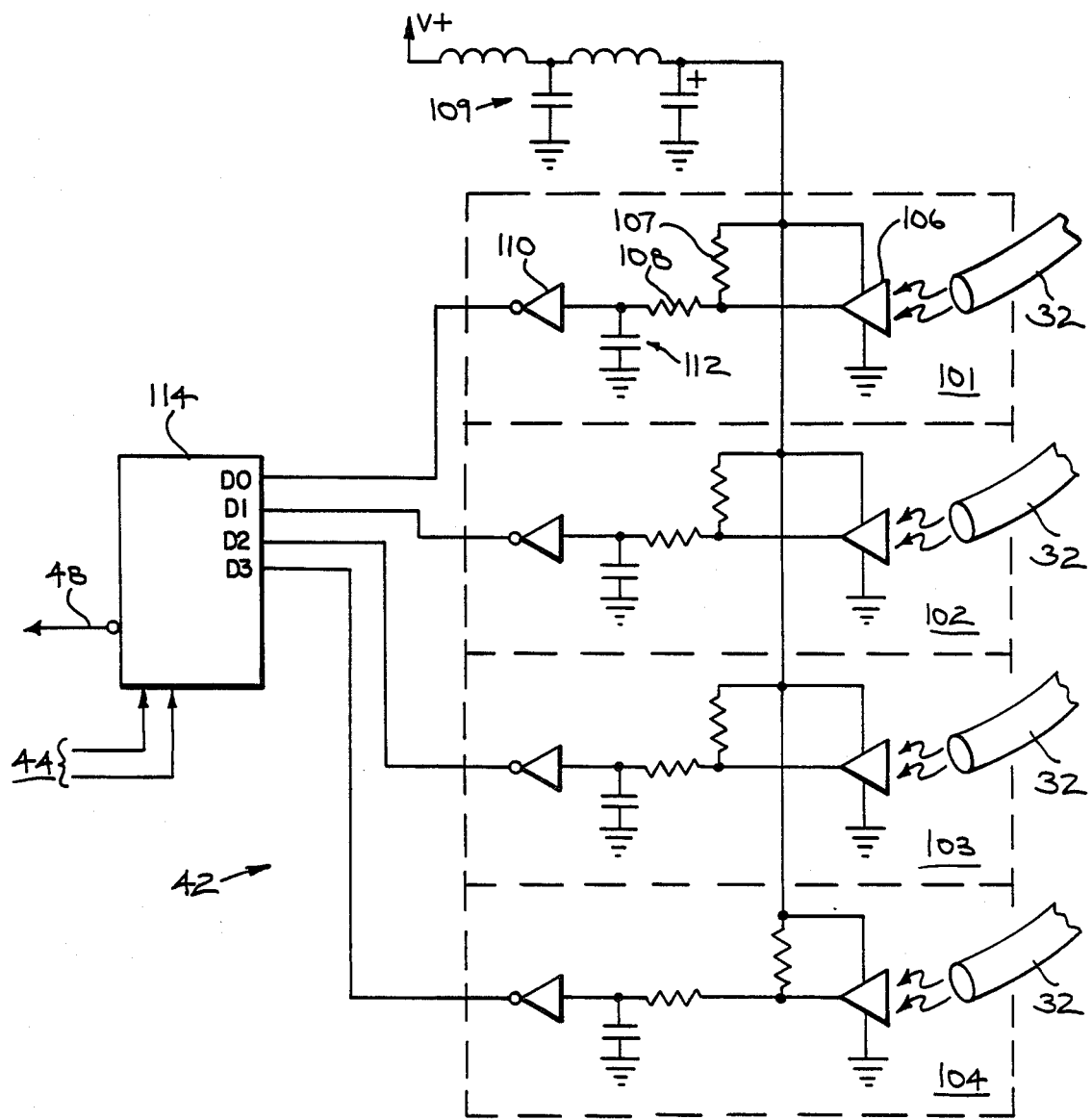
FIG. 4 is a schematic block diagram of the input circuit in FIG. 2.

The fiber optic response cables 32 from the various sensor devices 33 are coupled to a fiber optic input circuit 42 shown in detail in FIG. 4. The fiber optic input circuit 42, comprises four separate input channels, 101-104, with one of the fiber optic input cables 32 being coupled to each one of the channels. As the input channels 101-104 are indentical, only one of them, 101, will be described in detail. The response cable 32 from the sensor 33 (FIG. 1) is optically coupled to a photodetector 106 which has a response tuned to the wavelength of the light transmitted by the LED 92 through the fiber optic cables 31 and 32. In response to the receipt of the light from the response cable 32, detector 106 provides an electrical output signal which is coupled by resistor 108 to the input of a Schmitt trigger inverter 110. Pull-up resistor 107 couples the output terminal of the detector 106 to a positive voltage source via filter circuit 109. A capacitor 112 connects the input of the inverter 110 to ground. The output of the Schmitt trigger inverter 110 in each of the input channels 101-104 is connected to a separate input of a four-to-one multiplexer 114.

Referring again to FIG. 2, a microprocessor 46 controls the operation of the fiber optic I/O module 30 via microinstructions stored in ROM 53 connected to the microprocessor by data and address buses 54 and 55, respectively, and by one or more control lines 57. Microprocessor 46 may be any of several well-known devices such as an 8031 microprocessor manufactured by Intel Corp. Port 3 of the 8031 microprocessor has a serial data output pin (TXD) that is connected via line 50 to the output circuit 40. This port also has a serial data input pin (RXD) that is coupled via line 48 to the output terminal of the multiplexer 114 in the input circuit 42. Another port of the microprocessor supplies the power level selection signals to the output circuit 40 on lines 52 and supplies the received channel selection signals on lines 44 to the multiplexer 114 in the input circuit 42.

The microprocessor data bus 54 is also connected to an output data latch 56 which receives a data clocking signal from the microprocessor 46 via a control line 58. The output data latch 56 has a data clear terminal which is coupled to the reset line on the backplane of the remote I/O rack 17. The data latch 56 provides a temporary storage for an eight-bit data word which is to be sent on the backplane data bus of the remote I/O rack for the transmission to the programmable controller 10. Each of the eight output lines from the data latch 56 is connected to one input of a separate output NAND gate 60. The other inputs of each of the output NAND gates 60 are connected in common to a read input terminal for the fiber optic I/O module 30 which is connected to the read control line on the backplane control bus of the remote I/O rack 17.

Figure 5:
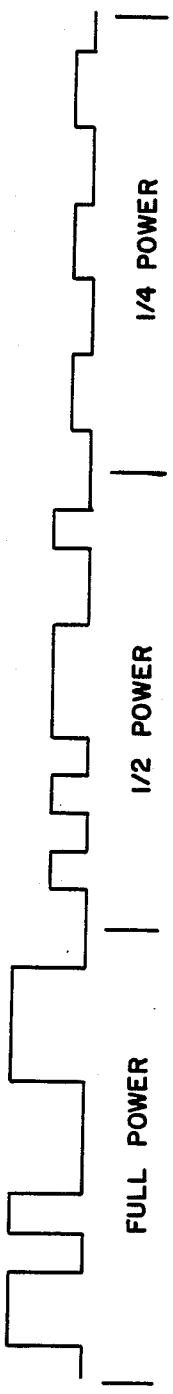
FIG. 5 is a waveform diagram of the optical signal sent over one of the fiber optic channels.

During the operation of the fiber optic I/O module 30, whenever the status of the sensor devices 33 is to be detected, light signals at three different power levels are sequentially sent to each sensor. If the sensor is closed so that the transmitted light is coupled from the first fiber optic cable 31 to the return fiber optic cable 32, the receiver channel of the I/O module will detect the return light levels. Depending upon which light levels are received by module, the degree of light attenuation and thereby the quality of the fiber optic communication link may be determined. For example, if only the full power signal is received a severe degradation of the link is indicated. To aid in the receiver detecting the various power levels, the transmitter sends a different unique signal at each level. Although any of several forms of unique signals may be used, the preferred embodiment transmits a different character at each light intensity (FIG. 5). The measure of the fiber optic link quality is then returned by the I/O module 30 to the programmable controller 10 so that an indication may be sent to the system operator enabling corrective action to be taken. Such action may include replacing the light emitting diode, cleaning various optical connectors in the link or replacing a damaged fiber optic cable.

With specific reference to FIGS. 2, 3 and 4 when the programmable controller wishes to interrogate the status of the sensor devices on the fiber optic links, a data word is sent to the fiber optic module 30 that is received on the corresponding data lines D4-D7. Typically, all four of the sensor devices connected to a given I/O module 30 will be interrogated together; however, individual sensors or various combinations of the four devices may be interrogated at a time. If all four sensors are to be interrogated, a data word having a one bit in each of the four most significant bits, D4-D7, is written to that module via the backplane data bus. Each of these bits is fed via the four inverters 36 to separate inputs of the input data latch 38 which is then clocked by a signal on the write line of the backplane causing the four data bits to be stored in the latch 38. Each of the four bits is then coupled to one of the NAND gates 71-74 in the fiber optic output driver circuit 40.

The microprocessor looks at the status of each sensor 33 sequentially by selecting one of the receiver channels 101-104 at a time and looking for a character at each of the three power levels. Microprocessor 46 initially switches the multiplexer 114 to receive the light pattern from one of the response cables 32 so as to produce an electrical signal on line 48 representative of the characters received from that cable.

The microprocessor 46 sends two bits over power selector lines 52 which when decoded by circuit 80 will enable the full power level by sending a low level logic signal to each of the first NOR gates 76 in the transmitter channels 81–84. The microprocessor also transmits a first unique character, that is designated as the full power character in FIG. 5, over the transmit line 50. This character is coupled to the other input of each of the NAND gates 71–74. The NAND gates that are enabled by the backplane data word pass the microprocessor data signal to the output that is coupled to the other input of each of the first NOR gates 76 causing the output transistor 86 to turn on and off corresponding to the bit pattern of the first character. This supplies a full power current level signal to all the LED's 92 coupled to each of the channels causing a full-power light level to be transmitted over each of the first fiber optic cables 31.

If the corresponding sensor device 33 coupled to each of the transmitter cables 31 is in a closed state, the light from the first cable will be coupled to the response cable 32 connected to that sensor. Normally, the light transmitted through the response cable 32 will be detected in the corresponding input channel 101–104 for that cable producing an output electrical signal at the respective input to the multiplexer 114 that replicates the transmitted character.

After the full power signal time period the microprocessor causes decoder 80 to activate only the second NAND gates 77 in each output channel 81–84. At this time a different character, designated the one-half power character in FIG. 5, is transmitted over each of the fiber optic cables 31 but a response signal is received at the microprocessor for only the selected input channel 101–104. After the half power time period has elapsed, the microprocessor 46 changes the state of the output power decoder 80 to enable only the third NOR gate 78. At this point in time the microprocessor transmits a third character over line 50 that is designated the one-quarter power character. When this character is coupled through the NAND gates 71–74 and the third NOR gate 78, the third transistor 88 will turn on driving the LED 92 at a third current level which is onefourth that of the current level when the LED was driven by the first branch having transistor 86 and resistor 96. As with the transmission of the full and one-half power signals, the signal received on the selected response cable 32 is detected and fed to the microprocessor 46.

After the three power level characters have been transmitted over the first cable link, the next input channel is selected by multiplexer 114 and the three power level signals are sent over that link. This process is repeated for all of the fiber optic sensor links.

The flow charts of the programs for the microprocessor 46 enabling it to carry out the aforementioned process are shown in FIGS. 6–9. The switching of the power levels and the receiver channels are carried out by timed interrupts For example, every two hundred and fifty microseconds the microprocessor 46 is interrupted and executes an interrupt routine, shown in FIG. 6 that sequentially selects one of the receiver channels 101–104 by transmitting the proper two bits over lines 44 to the multiplexer 114. A flag is then set in the microprocessor's on chip memory indicating that the scan of the previous channel is complete. At this time a word indicating which ones of the three power level signals were received is copied from a temporary memory location into the main memory table within the microprocessor RAM. The interrupt then ends returning the microprocessor operation to the main program.

Figure 7:
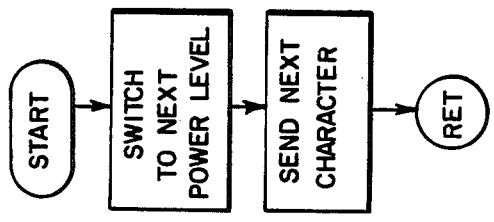
Figure 6:
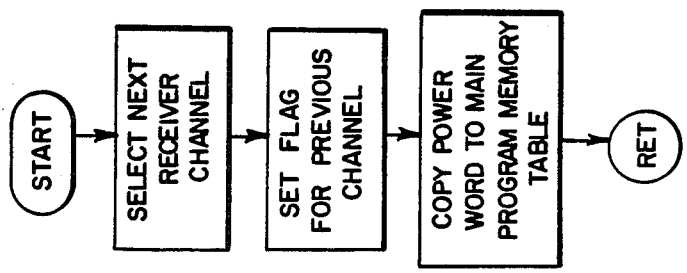

Every sixty microseconds the interrupt routine shown in FIG. 7 is executed to switch the output circuits 81–84 to a different power level. Specifically, the routine increments the binary bits transmitted on lines 52 to the power level decoder 80 selecting a different power level output line for the output channels 81–84. Then the routine transmits the proper digital character shown in FIG. 5 for the selected power level.

The cycling of the power level every 60 microseconds is asynchronous with respect to the I/O channel selection every 250 microseconds. Although the two cycles could be synchronized within the same I/O module 30, if one fiber optic module 30 is transmitting the characters and another module 30 is receiving the sensor response, the cycling of the two modules still would not be synchronized. Whether or not the cycles are synchronized, the 250 microsecond interrupt cycle provides a long enough window for the system to receive all three power level characters. The program that receives and processes the characters is insensitive to the order in which they are received. The receipt of a fourth character during the 250 microsecond window also will have no effect on the signal processing.

Figure 8:
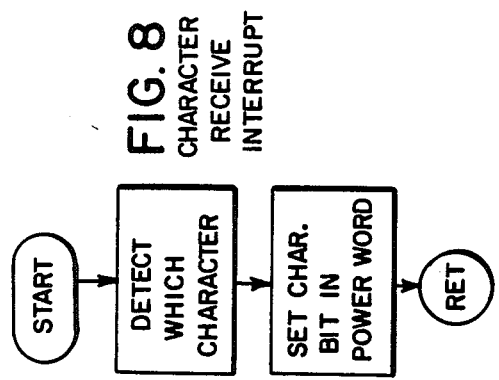
FIGS. 6, 7 and 8 are computer program flow charts of interrupt routines for the microprocessor in FIG. 2.
Figures 10, 11:
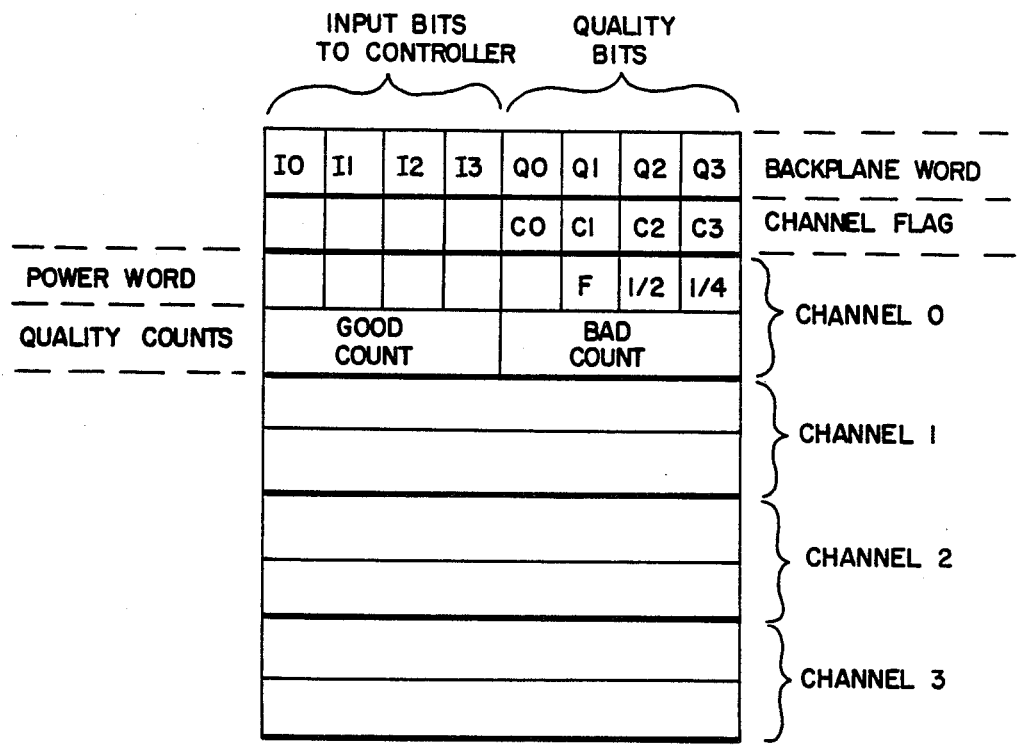
FIG. 10 is a diagram of the data structure used by the interrupt routines and main program.
FIG. 11 is a truth table for determining the quality of the fiber optic transmission link.

Each time a character is received via one of the input channels 101–104, a third interrupt is activated. The microprocessor 46 ignores any characters other than the three power characters shown in FIG. 5. As shown in FIG. 8, this interrupt routine detects which of the three power level characters was received and then sets a corresponding bit in a storage location designated as the power word to indicate the receipt of that character. This is the power word that is transferred from temporary storage to the main program memory table in the final step of the 250 microsecond interrupt routine shown in FIG. 6. FIG. 10 depicts the main data table in the microprocessor memory with the power word for the first channel (channel 0) shown with the least significant bits designated for indicating whether a full, one-half, or one-fourth power character ha been received. Each of the other three channels has a storage location assigned for its power word. The data table also contains the backplane word that includes four bits I0–I3 which indicate the status of the sensor devices and four bits Q0–Q3 that represent whether the fiber optic link is good or bad. The channel flags are also in the table.

Figure 9B:
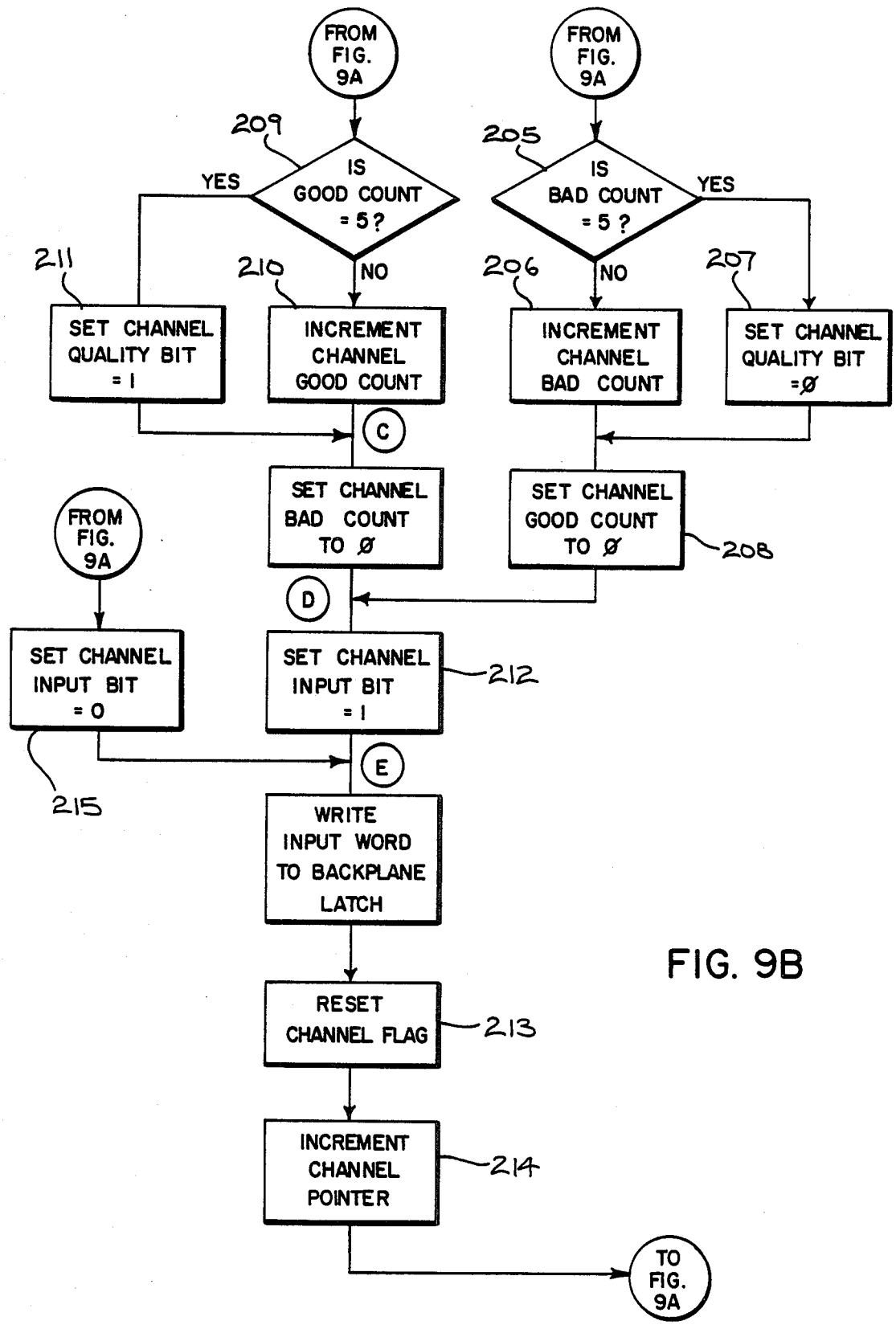
FIGS. 9a and b are a flow chart of the main computer program for the microprocessor of FIG. 2.
Figure 9A:
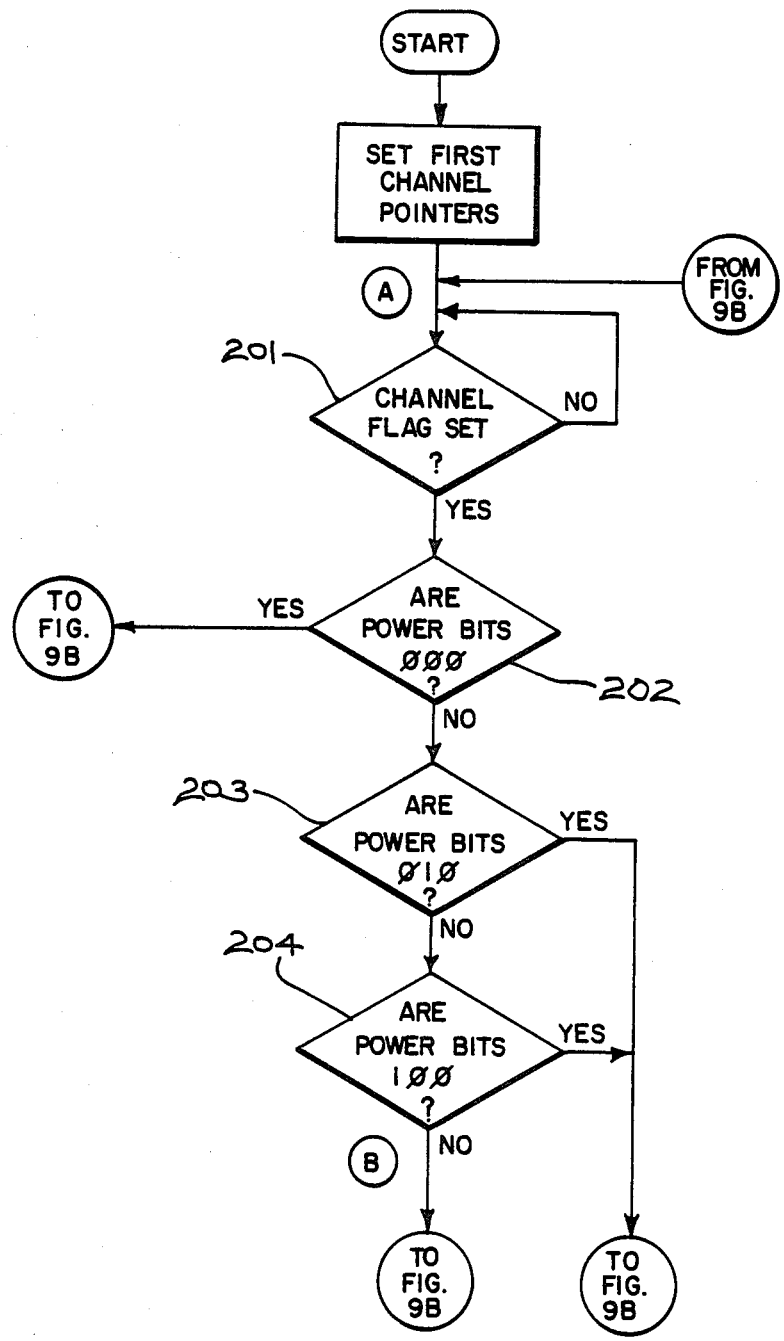

These power words are then interpreted by the main program to provide a measure of the light attenuation of the corresponding fiber optic control link. Referring to FIG. 9A, the main program starts by setting the memory pointers to the first channel so that it may access the power word and quality count nibbles for channel 0. The program at 201 then tests whether the channel flag has been set and if not continues to loop through that flag testing. Once the program determines that the flag has been set which indicates that 250 microsecond interrupt routine has completed a selection of that first channel, the power bits for channel are then tested at point 202.

The table in FIG. 11 shows the various combinations of bits in the digital power word for a fiber optic link with the corresponding bit to be sent out to the programmable controller 10 representing the sensor state, and the quality level that is indicated by the power word bit combination. Line a, where no fiber optic signal is returned for any of the three power levels typically exists when the sensing device 33 is opened so that no light is transmitted to the receiving channel. In this case, a zero bit is sent to the programmable controller 10 and the previous quality determination if left unchanged. In line b, a light level was returned for only the one-quarter power level. The only situation in which valid data would be received only at the one-quarter power level is if the sensor circuitry was being saturated by the receipt of an extremely intense light level at full and one-half power. This could be the case where the fiber optic link is very short and does not produce much attenuation of the light. In this case, data has been received and will be indicated by the one data bit in the backplane word and the quality level is good.

In line c, light was received only at the half-power level. This is an unlikely situation and probably would not exist in practice because if light was received at the halfpower level, it would also be received at either the fullpower level or the quarter-power level. Even though this set of circumstances is unlikely, in order for a properly functioning microprocessor program, an entry for this set of conditions must be provided. A digital one indicating that a signal was received from the sensor is placed in the backplane word along with an indication that a bad quality condition exists. In line d the characters were received at the half and one-quarter power levels but not at full power. As with line b, this condition could exist if a relatively short fiber optic link was employed resulting in a saturation of the detector circuit at a full-power light intensity. Therefore, a digital one is recorded in the backplane word indicating the sensor closure and a good quality level indicator is also recorded.

Line e indicates the reception of only the full-power character which typically indicates a severe degradation of the fiber optic link. This is indicated by a bad quality condition. In line f, the full and quarter-power characters were the only ones received. Here too it is unlikely that one would see this pattern in that if a signal was received at these two power levels, a character should also have been received at one-half power. However, because a one-quarter power level character was received, the fiber optic link is determined to have a good quality. In the remaining two power word bit combinations, lines g and h, a good quality determination exists.

Returning to the flow chart in FIGS. 9A and B, the main program examines the three bits of the power word to render a determination of whether the quality of the fiber optic link is good or bad. The first test 202 after a flag set has been detected is whether or not all three bits are zeros. If so, the program in FIG. 9B simply sets the corresponding input data bit in the backplane word to zero at 215 and then goes to point E on the flowchart. If the power word bits are not all zeros as determined in block 202 of FIG. 9A, the power word is tested for the bit combinations of 010 and 100 both of which indicate a poor quality link as indicated in FIG. 11. If either of these combinations is detected in steps 203 or 204 the program branches to the test in block 205 (FIG. 9B) where a count of bad quality determinations is checked to see whether five consecutive bad determinations have been made. There may be a sporadic occurrence which would lead to an occasional bad quality level determination for the channel. Therefore, in order for a bad quality indication to be sent to the programmable controller 10, five consecutive good or bad determinations must be made before a change in the quality signal to the programmable controller will be made. If the bad count in the RAM space for channel 0 does not indicate five consecutive bad counts, the count is merely incremented at 206, whereas if five consecutive bad counts have occurred the quality bit, Q0, for that channel in the backplane word is set to zero at 207 to indicate a bad quality line. This program branch then sets the good count for the channel to zero in box 208 and returns to point D in the main program flow.

If a good quality signal was received, the program continues through blocks 203 and 204 to step 209 where the good count is examined in to determine whether five consecutive good quality determinations have been made. If so, the program branches to step 211 to set the quality bit Q0 for the first channel to a one and returns to the main flowchart branch at point C. If the count is not equal to five, the good count in the memory for channel 0 is incremented. After point C the bad count is zeroed and the flow goes to program node D. After node D box 212 sets the channel input bit I0 to one and flow goes to node E.

Following node E the backplane input word in RAM is transferred to the output data latch 56 (FIG. 2) where it is temporarily stored and coupled to the output NAND gates 60. When the programmable controller scans the I/O module to read the sensor status it will send an enable signal on the read line which causes each of the NAND gates 60 to transmit the contents of data latch 56 to the backplane data bus. After this transfer of the backplane word to the data latch 56, the program at points 213 and 214 resets the channel flag and increments the channel pointer to the next channel space in RAM. Then the program returns to point A where the new channel flag is tested.

In this manner, the programmable controller 10 receives not only the status of the four sensor devices connected to the fiber optic I/O module 30 but also four bits which indicate the quality of each of the fiber optic links. If that bit indicates a poor quality link, the programmable controller 10 may report that fact via either the terminal 24 or to the host computer via network 28. This will then alert the system operator to the degradation of that specific fiber optic link enabling corrective action to be taken.

Although the present invention has been described in terms of fiber optic sensor input module, it has equal applicability to examining the status of a fiber optic output link. In this type of system the transmission of light by the module over a cable 31 causes a remote device to activate or deactivate. A second cable 32 could be used to return a verification of the remote device status as well as indicate the quality of the fiber optic link. Furthermore, the present invention may be applied to test other types of optical communication media.

I claim:

1. A communication system employing an optical communication link, said system comprising:
   a transmitter for transmitting a plurality of predefined light intensities through the communication link and including two power terminals, a light source coupled to the communication link and having a first terminal connected to one of the power terminals and a second terminal connected to a node, and means for selectively connecting different impedances between the other of the power terminals and the node to selectively apply at least two different magnitudes of electric current to the light source;

a means for receiving the light transmitted through said communication link;

means, coupled to said means for receiving, for determining for which ones of the plurality of transmitted light intensities light is and is not received; and means, responsive to said means for determining, for evaluating the attenuation characteristic of the optical communication link.

2. The communication system as in claim 1 wherein the transmitter includes means for sending a unique signal at each of the plurality of light intensities.

3. The communication system as in claim 2 wherein said means for determining includes means for detecting which ones of the unique signals are received and thereby determining for which ones of the transmitted light intensities light is received.

4. An input/output system for connecting a remote device to a programmable controller via a fiber optic communication link, said input/output system comprising:

means for transmitting light to the remote device through the fiber optic link at a plurality of intensity levels and including two power terminals, a light source having a first terminal connected to one of the power terminals and a second terminal connected to a node, and means for selectively connecting different impedances between the other of the power terminals and the node;

means for receiving light returned by the remote device via the fiber optic link;

means, coupled to said means for receiving, for determining for which ones of the plurality of transmitted light intensities light is and is not received from the remote device; and means, responsive to said means for determining, for evaluating the attenuation characteristic of the fiber optic communication link.

5. The system as in claim 4 wherein the transmitting means includes means for sending a unique signal at each of the plurality of light intensity levels.

6. The system as in claim 5 wherein said means for determining includes means for detecting which ones of the unique signals are received and thereby determining for which ones of the transmitted light intensity levels light is received.

* * * * *